US012785449B2

(12) United States Patent
Kim

(10) Patent No.: US 12,785,449 B2
(45) Date of Patent: *Nov. 3, 2026

(54) SYSTEM AND METHOD FOR DELIVERING ELECTRIC POWER

(71) Applicant: Young B. Kim, Colleyville, TX (US)

(72) Inventor: Young B. Kim, Colleyville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/800,821

(22) Filed: Aug. 12, 2024

(65) Prior Publication Data

US 2024/0405607 A1 Dec. 5, 2024

Related U.S. Application Data

(60) Continuation of application No. 18/069,710, filed on Dec. 21, 2022, now Pat. No. 12,100,967, which is a (Continued)

(51) Int. Cl.

*H02J 50/10* (2016.01)
*H02J 7/00* (2026.01)
(Continued)

(52) U.S. Cl.

CPC ................ *H02J 50/10* (2016.02); *H02J 7/00* (2013.01); *H02J 7/1415* (2013.01); (Continued)

(58) Field of Classification Search

CPC .. H02J 50/10; H02J 7/00; H02J 7/1415; H02J 7/1423; H02J 7/0013; H02J 3/36; (Continued)

(56) References Cited

U.S. PATENT DOCUMENTS 1,978,688 A 10/1934 Petersen
2,355,208 A 8/1944 Devol et al.
(Continued)

FOREIGN PATENT DOCUMENTS

CN 101218733 A 7/2008
CN 102640379 6/2015
(Continued)

OTHER PUBLICATIONS

"Decision of Grant of Patent for Invention mailed on Jul. 25, 2023", Korean Patent Application No. 10-2022-7039322, (3 pages).
(Continued)

*Primary Examiner* — Elim Ortiz
(74) *Attorney, Agent, or Firm* — Stephen M. De Klerk

(57) ABSTRACT

A system for transferring electric power is provided. A power supply conductor conducts a power supply current that generates a first resultant magnetic field. An electric motor has a power input terminal connected to the power supply conductor and a movable output component. A generator has a movable input component connected to the movable output component such that the movable output component causes movement of the movable input component. The generator converts the movement of the movable input component into a power output current to the power output terminal that generates a second resultant magnetic field. A plurality of field line guides are positioned for field lines of the second resultant magnetic field to couple to the plurality of field line guides and are formed to guide the field lines into a helical shape.

20 Claims, 6 Drawing Sheets

Related U.S. Application Data continuation of application No. 16/801,022, filed on Feb. 25, 2020, now Pat. No. 11,616,396, which is a division of application No. 15/402,598, filed on Jan. 10, 2017, now Pat. No. 10,615,640.

(51) Int. Cl.
*H02J 7/14* (2006.01)
*H02K 7/18* (2006.01)
*H02K 21/00* (2006.01)
*H02K 23/04* (2006.01)

(52) U.S. Cl.
CPC .......... *H02J 7/1423* (2013.01); *H02K 7/1807* (2013.01); *H02K 21/00* (2013.01); *H02K 23/04* (2013.01)

(58) Field of Classification Search
CPC . H02J 7/007192; H02K 7/1807; H02K 21/00; H02K 23/04; H02K 47/04; Y02T 10/70
See application file for complete search history.

(56) References Cited

U.S. PATENT DOCUMENTS

| | | | | |
|---|---|---|---|---|
| 3,617,851 | A | 11/1971 | Dupuy et al. | |
| 4,764,743 | A | 8/1988 | Leupold et al. | |
| 5,872,435 | A * | 2/1999 | Bolte | H02P 6/06 318/400.14 |
| 5,874,797 | A * | 2/1999 | Pinkerton | H02K 21/024 310/74 |
| 5,990,590 | A | 11/1999 | Roesel, Jr. et al. | |
| 6,392,370 | B1 | 5/2002 | Bedini | |
| 9,853,587 | B2 | 12/2017 | Swamy et al. | |
| 10,615,640 | B2 | 4/2020 | Kim | |
| 11,616,396 | B2 | 3/2023 | Kim | |
| 2006/0279086 | A1 | 12/2006 | Kishibata et al. | |
| 2011/0040418 | A1 * | 2/2011 | Kalen | H01M 10/46 700/291 |
| 2011/0148238 | A1 | 6/2011 | Goodzeit et al. | |
| 2012/0025942 | A1 | 2/2012 | Bhat et al. | |
| 2016/0172947 | A1 | 6/2016 | Kusakabe | |

FOREIGN PATENT DOCUMENTS

| | | | |
|---|---|---|---|
| CN | 109038943 | A | 12/2018 |
| JP | H09-294361 | A | 11/1997 |
| JP | 2007-189885 | A | 7/2007 |
| JP | 2009-273268 | A | 11/2009 |
| JP | 10-2011-0002961 | A | 1/2011 |
| JP | 2011-060978 | A | 3/2011 |
| JP | 2014-068465 | A | 4/2014 |
| JP | 2014-524229 | A | 9/2014 |
| JP | 2015-100255 | A | 5/2015 |
| JP | 2015-523051 | A | 8/2015 |
| JP | 2018-521319 | A | 8/2018 |
| TW | 340992 | B | 5/1997 |
| TW | 201004104 | A1 | 1/2010 |
| TW | 201504086 | A | 2/2015 |

OTHER PUBLICATIONS

"Decision of Rejection mailed on Mar. 8, 2023 with English translation", Japanese Patent Application No. 2019-558332, (3 pages).
"Extended European Search Report issued on May 4, 2020", European Patent Application No. 17891121.0, (9 apges).
"Final Office Action mailed on Mar. 7, 2019", U.S. Appl. No. 15/402,598, (18 pages).
"First Examination Report mailed on Mar. 24, 2021", Indian Patent Application No. 201947027142, (4 pages).
"International Search Report and Written Opinion mailed on Feb. 5, 2018", International PCT Patent Application No. PCT/US2017/063894, (8 pages).
"Non Final Office Action mailed on Aug. 9, 2018", U.S. Appl. No. 15/402,598, (22 pages).
"Office Action mailed on Mar. 24, 2022 with English translation", R.O.C Patent Application No. 107100890, (6 pages).
"Office Action mailed on Oct. 28, 2022 with English translation", R.O.C Patent Application No. 107100890, (18 pages).
Battery University , "BU-806a: How Heat and Loading affects Battery Life", www.batteryuniversity.com/learn/article/how_heat_and_harsh_loading_reduces_battery_life, (2 pages).
Kattenburg, Kathy , "What Do Batteries Do to the Environment If Not Properly Recycled?", http://education.seattlepi.com/batteries-environment-not-properly-recycled-3916.html, (4 pages).
Triggs, Robert , "Why phones explode sometimes, and what you can do to protect yourself", http://www.androidauthority.com/what-makes-smartphones-explode-714380/, (2 pages).
"First Office Action mailed on Oct. 15, 2025 with English translation", R.O.C. Patent Application No. 114117344, (6 pages).
"International Search Report and Written Opinion mailed on Oct. 7, 2025", International PCT Patent Application No. PCT/JP2025/080112, (10 pages).
"Office Action mailed on Mar. 27, 2025 with English Translation", Japanese Patent Application No. 2023-112962, (13 pages).
"Non Final Office Action mailed on Apr. 7, 2026", U.S. Appl. No. 18/800,848, (34 pages).
"Final Office Action mailed on Jun. 30, 2026", U.S. Appl. No. 18/789,001, (17 pages).

* cited by examiner

SYSTEM AND METHOD FOR DELIVERING ELECTRIC POWER

CROSS-REFERENCE TO RELATED APPLICATIONS

This is a continuation of U.S. Patent Application No: of U.S. patent application Ser. No. 18/069,710, filed on Dec. 21, 2022, which is a continuation of U.S. patent application Ser. No. 16/801,022, filed on Feb. 25, 2020 now U.S. Pat. No. 11,616,396, which is a divisional of U.S. patent application Ser. No. 15/402,598, filed on Jan. 10, 2017 now U.S. Pat. No. 10,615,640, all of which are incorporated herein by reference in their entirety.

BACKGROUND OF THE INVENTION

1). Field of the Invention

This invention relates to a system and method for transferring electric power.

2). Discussion of Related Art

A multitude of devices these days use rechargeable batteries, for example lithium-based rechargeable batteries. Mobile phones, vehicles, drones and the like are normally disconnected from an electric power supply grid when they are being operated, which causes their batteries to lose their charge. The batteries then have to be connected to an electric power supply grid so that they can be recharged.

It usually takes at least a half an hour, and often more time to fully recharge a fully-depleted battery. Batteries generate a fair amount of heat when they are being recharged and an excessive amount of heat can cause damage to a battery, which can destroy the battery or reduce its life expectancy. Battery chargers are designed to limit the rate at which power is provided to the batteries when they are being recharged so that their temperatures remain below the temperature at which damage may occur.

A battery charger normally includes a single phase alternating current power supply conductor with a socket that is connected to a wall outlet. The wall outlet is connected to an electric power supply grid. The battery charger includes a rectifier that converts alternating current received from the electric power supply grid to direct current. The direct current is then provided through a delivery circuit to positive and negative terminals on a battery. A power controller may be included to control the amount of power that is provided to the battery, although it may be possible to control power provided to the battery by connecting multiple batteries in series or in parallel.

When designing a battery charger, various factors are normally taken into account. For example, the voltage and power supplied by the electric power supply grid, the inclusion of transformers and the number and sizes of the batteries are taken into consideration, especially for purposes of minimizing the temperatures of the batteries while they are being charged. However, no satisfactory explanation has been forthcoming as to why the batteries heat up in the first place. For example, Ohm's law, which states that the sum of voltages in a closed loop will always equal zero, does not provide a satisfactory explanation as to why the batteries heat up during recharge.

Heat generation results in a high temperature that limits how fast a battery can be charged. A high temperature also limits the voltage to which a battery can be charged, which means that the capacity of the battery is decreased with a corresponding decrease in time before the battery runs out of charge. High charging temperatures means that the life time of the battery, i.e. the number of times that the battery can be recharged, is reduced as described in "BU-806a: How Heat and Loading affects Battery Life." A high temperature also results in a danger of explosion as described in "Why phones explode sometimes, and what you can do to protect yourself" by Robert Triggs. It is also not possible to recharge batteries that are considered not rechargeable. For example, lithium-based batteries are rechargeable, but that alkaline-based batteries are not rechargeable. A net negative effect on the environment is created when alkaline-based batteries are dispensed as described in "What Do Batteries Do to the Environment If Not Properly Recycled?" by Kathy Kattenburg.

Outside of the field of battery chargers, other electric power delivery systems often suffer the same fate of excess heat that cannot be readily explained. For example, it is not always possible to explain why certain electric fires happen when the systems are subsequently analyzed for failures using engineering principles that are commonly available at this time.

SUMMARY OF THE INVENTION

The invention provides a system for transferring electric power including a power supply conductor to conduct a power supply current that generates a first resultant magnetic field, an electric motor having a power input terminal connected to the power supply conductor and a movable output component, the electric motor being configured to convert the power supply current to movement of the movable output component, a generator having a movable input component connected to the movable output component such that the movable output component causes movement of the movable input component, and a power output terminal, the generator being configured to convert the movement of the movable input component into a power output current to the power output terminal that generates a second resultant magnetic field that is uncoupled from the first resultant magnetic field and a plurality of field line guides positioned for field lines of the second resultant magnetic field to couple to the plurality of field line guides, wherein the plurality of field line guides are formed to guide the field lines into a helical shape.

The system may further include that the power supply conductor is a single phase alternating current power supply conductor, further including a single phase alternating current ground conductor, a speed controller connected to the single phase alternating current power supply conductor and to the single phase alternating current ground conductor and at least one motor power supply conductor connecting the speed controller to the motor, wherein the speed controller is operable to control a speed of the movable output component.

The system may further include three three-phase motor power supply conductors connecting the speed controller to the electric motor.

The system may further include that the movable output component is a rotating output axle.

The system may further include the movable input component is a rotating input axle.

The system may further include the generator includes a coil and first and second magnets that are mounted in position to create a current generation magnetic field between the first and second magnets, wherein at least a first set of the field line guides are formed in the first magnet.

The system may further include that at least a second set of the field line guides are formed in the second magnet.

The system may further include that the movable input component moves the coil and the magnet relative to one another to generate a current in the coil.

The system may further include that the movable input component rotates the coil and the magnet relative to one another to generate a current in the coil.

The system may further include a delivery circuit and at least a first commutator that connects a first end of the coil to delivery circuit.

The system may further include at least a second commutator that connects a second end of the coil to the delivery circuit, the coil having a section between the first and second ends thereof that travels through a current generation magnetic field created by the magnets to generate the current in the coil.

The system may further include that the first and second magnets are first and second permanent magnets.

The system may further include that the first and second magnets are first and second electromagnets, further including an electromagnet power delivery circuit connected to the first and second electromagnets.

The system may further include a delivery circuit connected to the power output terminal, the delivery circuit including at least a first set of charging terminals including a positive charging terminal and a negative terminal that are positioned relative to one another for charging a first battery.

The system may further include at least a first battery having positive and negative battery terminals connected between the positive and negative charging terminals of the first set of charging terminals.

The system may further include at least a second set of charging terminals including a positive charging terminal and a negative terminal that are positioned relative to one another for charging a second battery.

The system may further include that the second resultant magnetic field has a helical shape around the battery and a pitch of the helical shape around the battery is the same as a pitch of the field line guides.

The system may further include that the first resultant magnetic field has a helical shape with a pitch that is larger than a pitch of the field line guides.

The invention also provides a method of transferring electric power including conducting a power supply current that generates a first resultant magnetic field, converting the power supply current to movement of the movable output component, converting the movement into a second electric current that generates a second resultant magnetic field that is uncoupled from the first resultant magnetic field and coupling field lines of the second resultant magnetic field to a plurality of field line guides formed to guide the field lines into a helical shape.

The invention further provides a system for transferring electric power including means for conducting a power supply current that generates a first resultant magnetic field, means for converting the power supply current to movement of the movable output component, means for converting the movement to into a second electric current that generates a second resultant magnetic field that is uncoupled from the first resultant magnetic field and means for coupling field lines of the second resultant magnetic field to a plurality of field line guides formed to guide the field lines into a helical shape.

BRIEF DESCRIPTION OF THE DRAWINGS

The invention is further described by way of examples with reference to the accompanying drawings, wherein.

DETAILED DESCRIPTION OF THE INVENTION

Figure 1A:
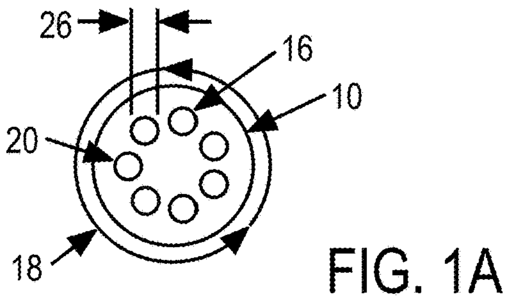
FIGS. 1A and 1B are top and perspective side views illustrating magnetic field lines created when a voltage is applied over a conductor to conduct current.
Figure 1B:
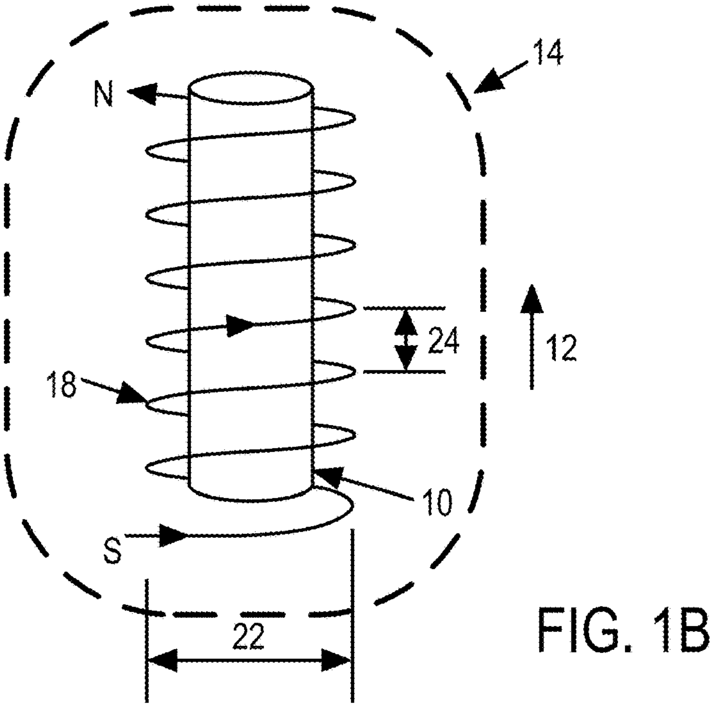

FIGS. 1A and 1B illustrate a conductor 10 that carries current in a direction out of the page in FIGS. 1A and 1*n* an upward direction 12 in FIG. 1B. As more clearly shown in FIG. 1B, a magnetic field 14 is created around the conductor 10 and within the conductor 10.

The magnetic field 14 forms a plurality of primary magnetic field lines 16 and a secondary magnetic field line 18. According to the Right-hand Rule, the primary magnetic field lines 16 and the secondary magnetic field line 18 are counter clockwise in the view of FIG. 1A. Each one of the primary magnetic field lines 16 is located within the conductor 10 and is formed about a respective core (Korean: “HEK”). The cores 20 jointly form a core for the secondary magnetic field line 18 that forms around the conductor 10.

As can be more clearly seen in FIG. 1B, the secondary magnetic field line 18 has a spiral form around the conductor 10. The spiral formed by the secondary magnetic field line 18 has South at the bottom and North at the top. The spiral formed by the secondary magnetic field line 18 has a diameter 22 and a pitch 24.

Similarly, each one of the primary magnetic field lines 16 shown in FIG. 1A forms a respective spiral within the conductor 10. Each one the primary magnetic field lines 16 has South at the bottom and North at the top in FIG. 1B. The primary magnetic field lines 16 each have a diameter 26 that is much smaller than the diameter 22. Each one of the primary magnetic field lines 16 and the secondary magnetic field line 18 have the same pitch 24.

Figure 2:
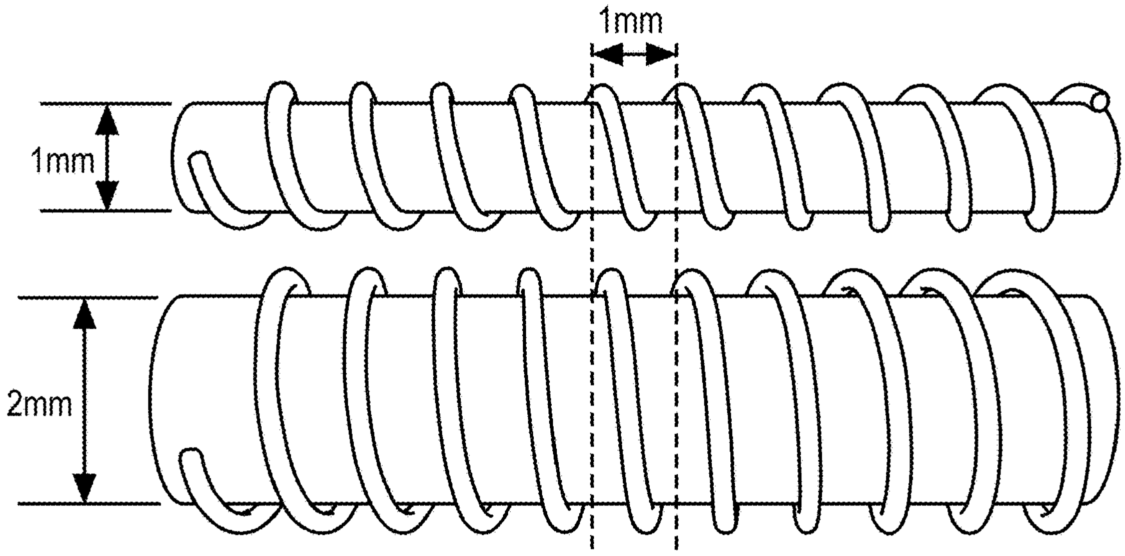
FIG. 2 is a side view illustrating small-and large diameter magnetic field lines.

Because no charge exists in the conductor 10, no electric current runs through the conductor 10. Instead, electric current is carried by the magnetic field 14, and primarily from South to North by the secondary magnetic field line 18 of the magnetic field 14. Electric current thus travels in a spiral form close to or on a surface of the conductor 10, and a direction of the spiral is counter clockwise in FIG. 1A according to the Right-Hand Rule. A voltage that is applied over the conductor 10 thus creates a resultant secondary magnetic field line 18 (Korean: "Rasun") that carries current in a spiral form therewith. A spiral magnetic field has a magnitude in Rasun. The magnitude of the magnetic field does not change in Rasun if the amount of current increases or decreases. As shown in FIG. 2, if the diameter of the resultant magnetic field line doubles, while the pitch remains the same, the magnitude in Rasun also doubles.

Figure 3:
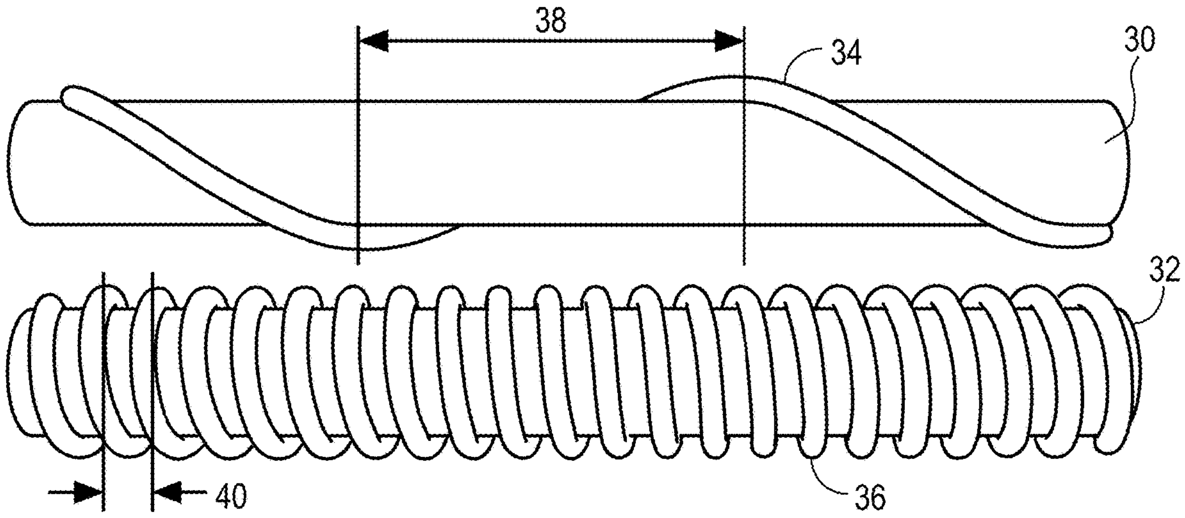
FIG. 3 is a side view illustrating helical shapes of magnetic field lines of a single phase alternating current power supply conductor connected to an electric power supply grid and around a battery that is being charged.

FIG. 3 illustrate a single phase alternating current power supply conductor 30 that is used to charge a battery 32. A first resultant magnetic field line 34 is formed around the single phase alternating current power supply conductor 30 and a second resultant magnetic field line 36 forms around the battery 32. The first resultant magnetic field line 34 forms a helical shape with a pitch 38 of approximately 20 meters while the second resultant magnetic field line 36 forms a helical shape with a pitch 40 of between 1 and 2 millimeters. The pitch 40 is thus smaller than the pitch 38.

Figure 4:
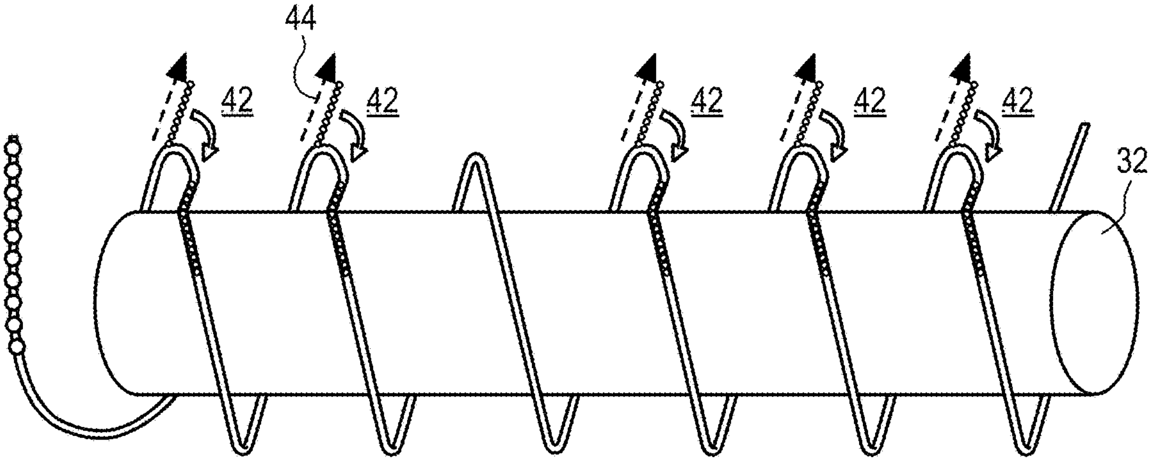
FIG. 4 is side view illustrating how heat is generated when the two helical shapes in FIG. 3 try to match one another.

FIG. 4 illustrates a heating effect that is created when the first and second resultant magnetic field lines 34 and 36 in FIG. 3 meet at or close to the battery 32. The longer pitch 38 is chopped off at multiple locations 42 in order to make it shorter. Core particles 44 are then released to the atmosphere. Such a release of core particles 44 generates heat. Such heat may cause damage to the batteries while they are being charged. One way to reduce the heat buildup within the battery 32 may be to reduce the amount of power that is provided to charge the battery 32. A reduction in power provided to charge the battery will result in longer charging times. In the case of alkaline-based batteries, it may not be possible to charge them at all, because of their much lower tolerance to heat than for example lithium-based batteries.

Figure 5:
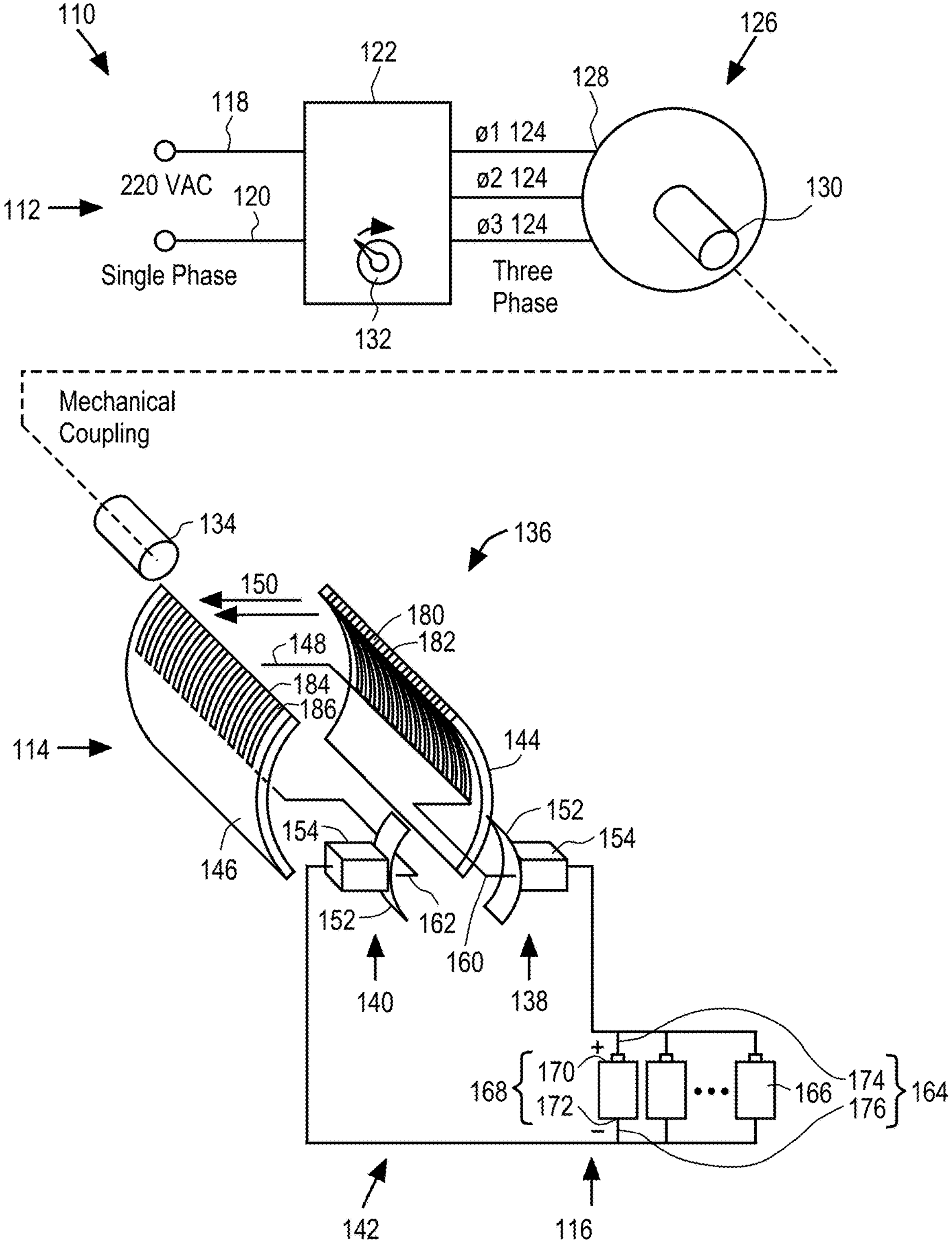
FIG. 5 is a diagram partially in block diagram form and partially in perspective form illustrating a system for transferring power, according to an embodiment of the invention.

FIG. 5 of the accompanying drawings illustrates a system 110 for transferring power. The system 110 is used as a battery charger in the embodiment of FIG. 5. The system 110 includes a first subsystem 112 for converting electric power to mechanical power, a second subsystem 114 for converting mechanical power to electric power, and a third subsystem 116 for charging of batteries.

The first subsystem 112 includes a single phase alternating current power supply conductor 118, a single phase alternating current ground conductor 120, a speed controller 122, first, second and third three-phase motor power supply conductors 124, and an electric motor 126.

The single phase alternating current power supply conductor 118 and the single phase alternating current ground conductor 120 are connected to the speed controller 122. Each one of the three-phase motor power supply conductors 124 connect the speed controller 122 to a respective power input terminal 128 of the electric motor 126. The speed controller 122 receives a single phase alternating current through the single phase alternating power supply conductor 118. The speed controller 122 provides three-phase power through the three-phase motor power supply conductors 124 to the electric motor 126.

The electric motor 126 includes a respective coil (not shown) connected to a respective one of the power input terminals 128. The coils typically form the stator of the electric motor 126. The electric motor 126 further has a rotor (not shown) with a plurality of permanent magnets. When three-phase power is provided to the power input terminals 128 and the coils, the coils cause rotation of the rotor. The electric motor 126 further has a rotating output axle 130 that is rotated by the rotor of the electric motor 126. The rotating output axle 130 serves as a movable output component. When electric power is provided through the single phase alternating current power supply conductor 118, the power is converted by the speed controller 122 and the electric motor 126 to mechanical power by causing rotational movement of the rotating output axle 130. The speed controller 122 has an adjustable input 132. An operator can adjust the adjustable input 132 to alter the amount of power and speed provided to the rotating output axle 130.

The second subsystem 114 includes a rotating input axle 134, a generator 136, first and second commutators 138 and 140, respectively, and a power delivery circuit 142.

The generator 136 includes first and second permanent magnets 144 and 146 respectively, and a coil 148. The first and second permanent magnets 144 and 146 are mounted on opposite sides of the coil 148. The first and second permanent magnets 144 and 146 are mounted in a position to create a current generation magnetic field 150 between the first and second permanent magnets 144 and 146.

The coil 148 is rotatably mounted between the first and second permanent magnets 144 and 146. The rotating input axle 134 is mounted to the coil 148. Rotation of the rotating input axle 134 rotates the coil 148. When the coil 148 rotates, sections thereof pass through the current generation magnetic field 150. When sections of the coil 148 pass through the current generation magnetic field 150, the relative movement generates a current in the coil 148.

Each commutator 138 and 140 has a respective contact 152 and a respective brush 154. The contact 152 of the first commutator 138 is permanently connected to and rotates with a first end 160 of the coil 148. The contact 152 of the second commutator 140 is permanently connected to and rotates with a second end 162 of the coil 148. The current that is generated within the coil 148 is an alternating current. The brushes 154 alternate their contact with the contacts 152 so that the current that is conducted from the coil 148 to the delivery circuit 142 is a pulsing direct current (DC) within the delivery circuit 142.

The third subsystem 116 includes a plurality of sets 164 of charging terminals and a plurality of batteries 166. Each battery includes a set 168 of battery terminals, including a respective positive battery terminal 170 and a respective negative battery terminal 172. Each set 164 of charging terminals includes a respective positive charging terminal 174 and a respective negative charging terminal 176. Each battery 166 is connected to the delivery circuit 142 so that a respective positive battery terminal 170 is connect to a respective positive charging terminal 174 and a respective negative battery terminal 172 is connected to a respective negative charging terminal 176. The batteries 166 are connected in parallel to the delivery circuit 142 and receive DC voltage from the delivery circuit 142.

The first permanent magnet 144 is formed to have a first set of field line guides 180. Slots 182 are formed within the first permanent magnet 144 such that the slots 182 are alternated with respective field line guides 180. The field line guides 180 and the slots 182 extend in a radial direction about an axis of rotation of the coil 148. Because the slots 182 are made of air, less magnetic field will concentrate within the slots 182 than within the field line guides 180.

Similarly, the second permanent magnet 146 is formed with a second set of field line guides 184 that are alternated by slots 186. The field line guides 184 and slots 186 extend in a radial direction about an axis of rotation of the coil 148.

In use, the single phase alternating power supply conductor 118 and the single phase alternating current ground conductor 120 are connected to an alternating current source. Terminals of the single phase alternating current power supply conductor 118 and the single phase alternating current ground conductor 120 are typically formed on a plug connector that allows for insertion of the conductors 118 and 120 into a wall outlet. The wall outlet may for example provide 220 Volt alternating current or 110 Volt alternating current to the speed controller 122. The speed controller 122 converts the alternating current received from the wall outlet to three-phase alternating current and provides the three-phase alternating current through the three-phase motor power supply conductors 124 to the electric motor 126. When power is provided to the electric motor 126, the rotating output axle 130 is rotated. An operator can change the speed at which the rotating output axle 130 rotates by making adjustments to the adjustable input 132 of the speed controller 122.

The rotating output axle 130 of the electric motor 126 is directly connected to the rotating input axle 134 of the generator 136. Rotation of the electric motor 126 thereby causes corresponding rotation of the coil 148. In the present embodiment, a one-to-one ratio exists between rotation of the rotating output axle 130 and the rotating input axle 134. In another embodiment, a transmission may provide for a different ratio of rotational speeds.

When the coil 148 rotates within the current generation magnetic field 150, an alternating electric current is generated within sections of the coil 148. The first and second commutators 138 and 140 convert the alternating electric current that resides within the coil 148 to DC and provides a DC Voltage to the batteries 166.

The first subsystem 112 is connected to the electric power supply grid. The electric supply grid has a first resultant magnetic field that forms a coil about the conductors of the first subsystem 112. The first subsystem 112 is not electrically connected to the second subsystem 114, but instead is mechanically connected through the rotating output axle 130 and the rotating input axle 134. Because they are electrically disconnected, the first resultant magnetic field that exists within the first subsystem 112 does not transfer onto or interfere with the second subsystem 114. The second subsystem 114 forms a second resultant magnetic field that is disconnected from the first resultant magnetic field of the first subsystem 112. The second resultant magnetic field created by the second subsystem 114 has field lines that follow the field line guides 180 and 184. The field line guides 180 and 184 are formed to guide the field lines into a helical shape. A core of the helical shape of the second resultant magnetic field is initially through an axis of rotation of the coil 148 and a helical shape forms around the coil 148 while following the field line guides 180 and 184.

The second resultant magnetic field transfers to the delivery circuit 142 and to the batteries 166. The batteries 166 thus share the same second resultant magnetic field. Furthermore, a pitch of the second resultant magnetic field around each battery 166 is the same as a pitch from one of the field line guides 180 to an adjacent field line guide 180.

Figure 6:
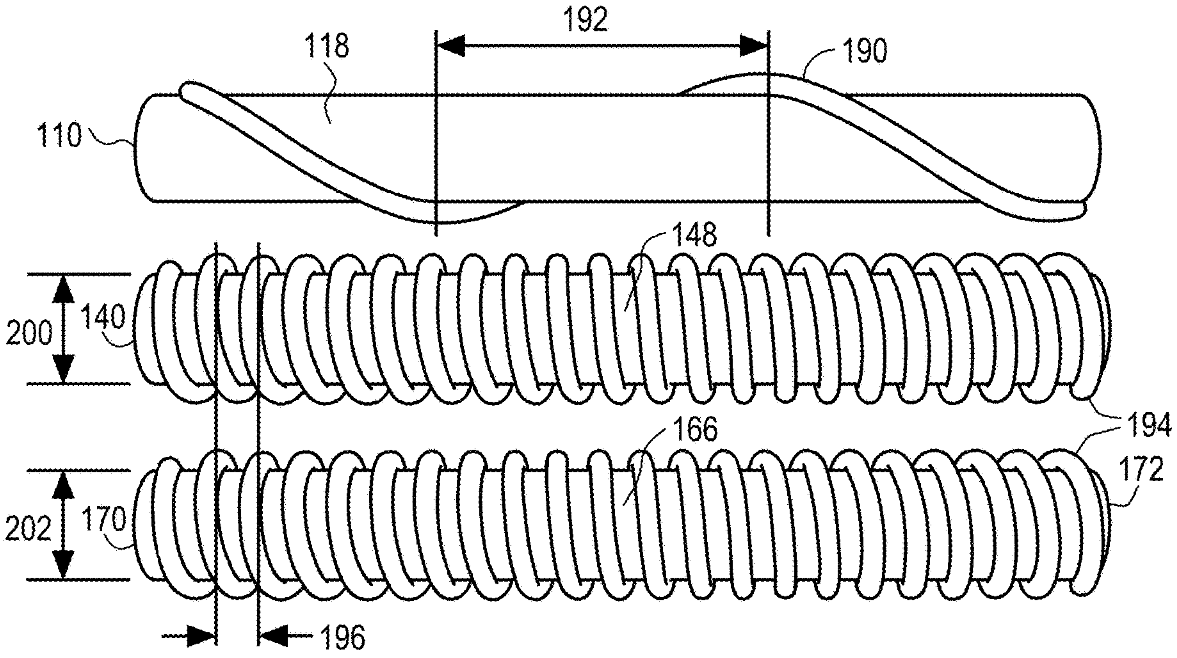
FIG. 6 is a side view illustrating helical shapes of a first resultant magnetic field and second resultant magnetic field that are formed by the system in FIG. 5.

FIG. 6 illustrates a first resultant magnetic field 190 on the single phase alternating current power supply conductor 118 in FIG. 5. The first resultant magnetic field 190 forms a helical shape with a core in a center of the single phase alternating current power supply conductor 118. The helical shape of the first resultant magnetic field 190 has a pitch 192 of approximately 20 meters.

FIG. 6 further illustrates a second resultant magnetic field 194 around the coil 148 in FIG. 5. The second resultant magnetic field 194 has a helical shape with a core that coincides with an axis of rotation of the coil 148 in FIG. 5. The second resultant magnetic field 194 has a pitch 196 that is equal to a pitch from one of the field line guides 180 to an adjacent field line guide 180 in FIG. 5. The pitch 196 is typically between 1 and 2 millimeters. What should be noted is that the pitch 196 is different and much smaller than the pitch 192. The components of the second subsystem 114 and the first subsystem 112 in FIG. 5 are electrically disconnected. As such, the first resultant magnetic field 190 does not influence, interrupt, or interfere with the second resultant magnetic field 194.

FIG. 6 further shows the second resultant magnetic field 194 around one of the batteries 166. The second resultant magnetic field 194 has a helical shape with a core that corresponds with a center line of the battery 166. The helical shape of the second resultant magnetic field 194 has the same pitch 196 as the helical shape of the second resultant magnetic field 194 around the coil 148. Because the pitch 196 of the second resultant magnetic field 194 remains constant, no or much less heat is generated within the second and third subsystems 114 and 116 than would be the case if the third subsystem 116 would be directly connected to the electric power supply grid.

Because heat generation is eliminated or is virtually eliminated in the charging cycle of the batteries, it is possible to charge a given battery much faster without causing damage to the battery than would be the case if the battery heats up. The elimination of heat also means that a given battery can also be charged to a higher voltage, which means that the capacity of the battery is increased with a corresponding increase in time before the battery runs out of charge. The elimination of heat also means that the life time of the battery, i.e. the number of times that the battery can be recharged, increases. The elimination of heat also means that the danger of explosion that is caused by charging cycles diminishes. It is also possible to recharge batteries that are considered not rechargeable. For example, the general belief is that lithium-based batteries are rechargeable, but that alkaline-based batteries are not rechargeable. However, by eliminating heat, it is possible to recharge alkaline-based batteries using the system 110 of FIG. 5. A net positive effect on the environment is created when alkaline-based batteries are recharged instead of being dispensed.

The second resultant magnetic field 194 has a diameter 200 around the coil 148 and a diameter 202 around the battery 166. The diameter 200 is shown to be the same as the diameter 202. It should, however, be understood that the diameter 202 may be smaller or larger than the diameter 200. If the diameters 200 and 202 are not the same, very little or no heat is generated because the pitch 196 will be equal around the coil 148 and around the battery 166 regardless of a difference in the diameters 200 and 202.

Figure 7A:
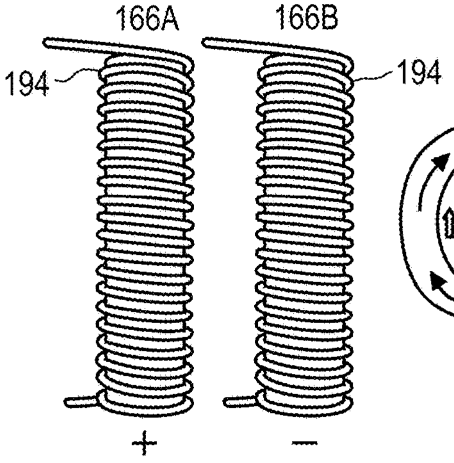
FIGS. 7A, 7B and 7C are side, top-plan and diagrammatic side views illustrating merging of magnetic fields when adjacent batteries are being charged.
Figure 7B:
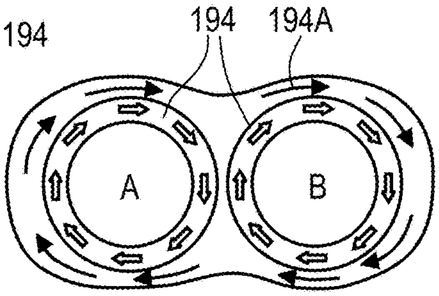
Figure 7C:
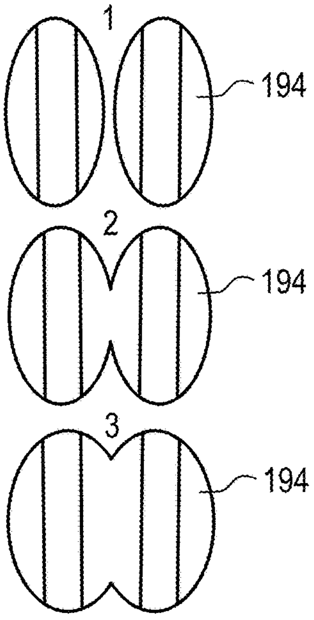

FIGS. 7A, 7B and 7C show two batteries 116A and B adjacent one another. Each battery 166A or 166B has a respective second resultant magnetic field 194 around a respective one of the batteries 166A and 166B. The second resultant magnetic fields 194 merge to form a combined second resultant magnetic field 194A. The merged second resultant magnetic field 194A is much larger than the second resultant magnetic fields 194 individually. The merged second resultant magnetic field 194A has the same pitch as the second resultant magnetic fields 194 around the batteries 166A and 166B and around the coil 148 shown in FIG. 6.

Because the pitch remains constant, little or no heat is generated by the interaction between the second resultant magnetic field 194 and the merged second resultant magnetic field 194A.

Figure 8:
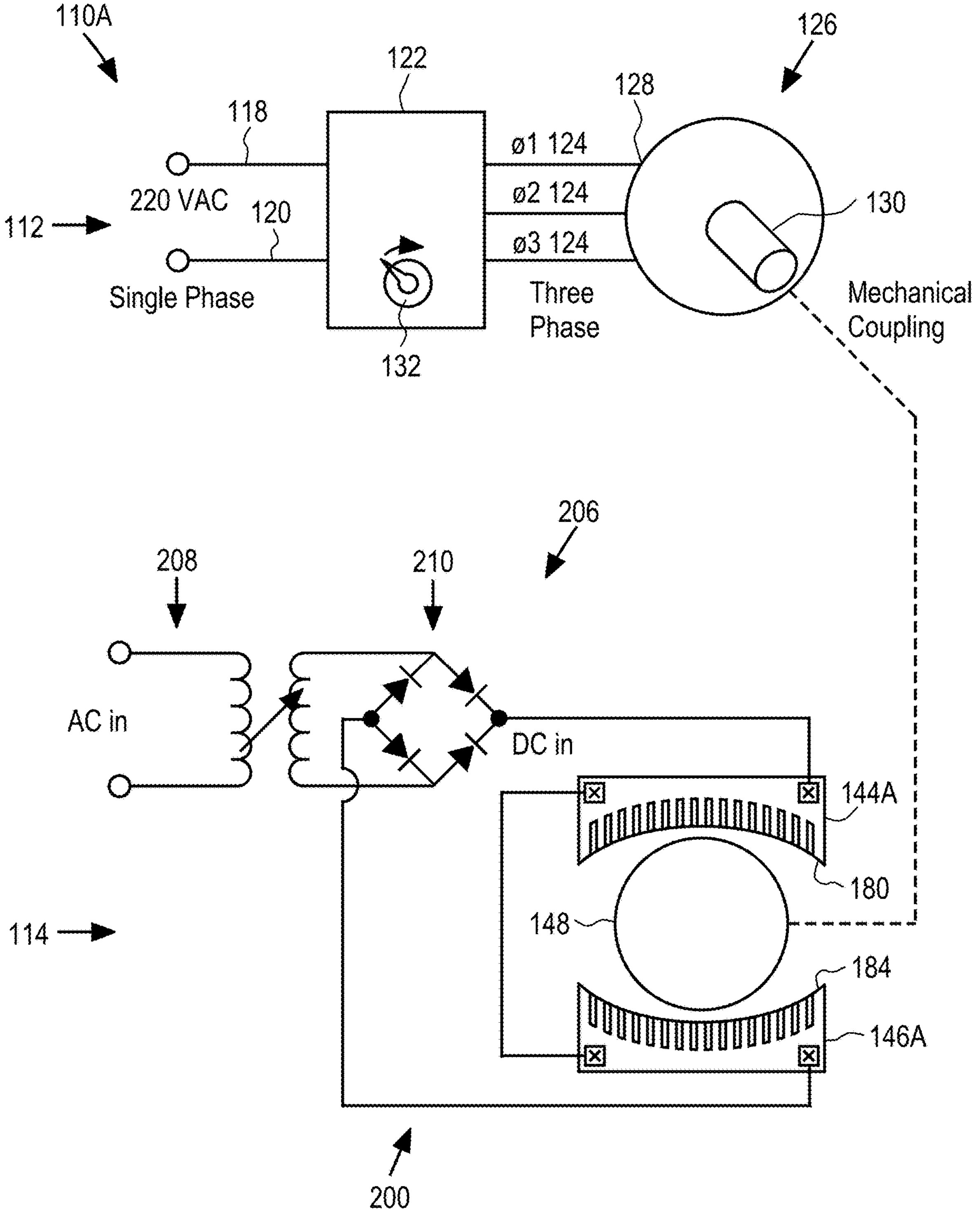
FIG. 8 is a view that is partially in block diagram form and partially in end view form showing a system for transferring electric power according to alternate embodiment of the invention.

FIG. 8 shows a system 110A according to alternate embodiment of the invention. The system 110A includes first and second electromagnets 144A and 146A and an electromagnet power delivery circuit 206. The first and second electromagnets 144A and 146A take the place of the first and second permanent magnets 144 and 146, respectively, in FIG. 5. The electromagnet power delivery circuit 206 includes a single phase alternating current power supply 208 and a rectifier 210. Alternating current is provided to the single phase alternating current power supply 208. The rectifier 201 converts the alternating current to DC and provides a DC current to the first and second electromagnets 144A and 146A.

The system 110A includes field line guides 180 and 184 that are attached to the first and second electromagnets 144A and 146A, respectively. The field line guides 180 and 184 serve the same purpose in the system 110A of FIG. 8 as in the system 110 of FIG. 5. All other components of the system 110A of FIG. 8 are the same or similar to the components of the system 110 of FIG. 5 and like reference numerals indicate like components. Although not shown, it should be understood that the system 110A of FIG. 8 includes a delivery circuit and a third subsystem similar to the delivery circuit 142 and third subsystem 116 of the system 110 of FIG. 5.

Figure 9:
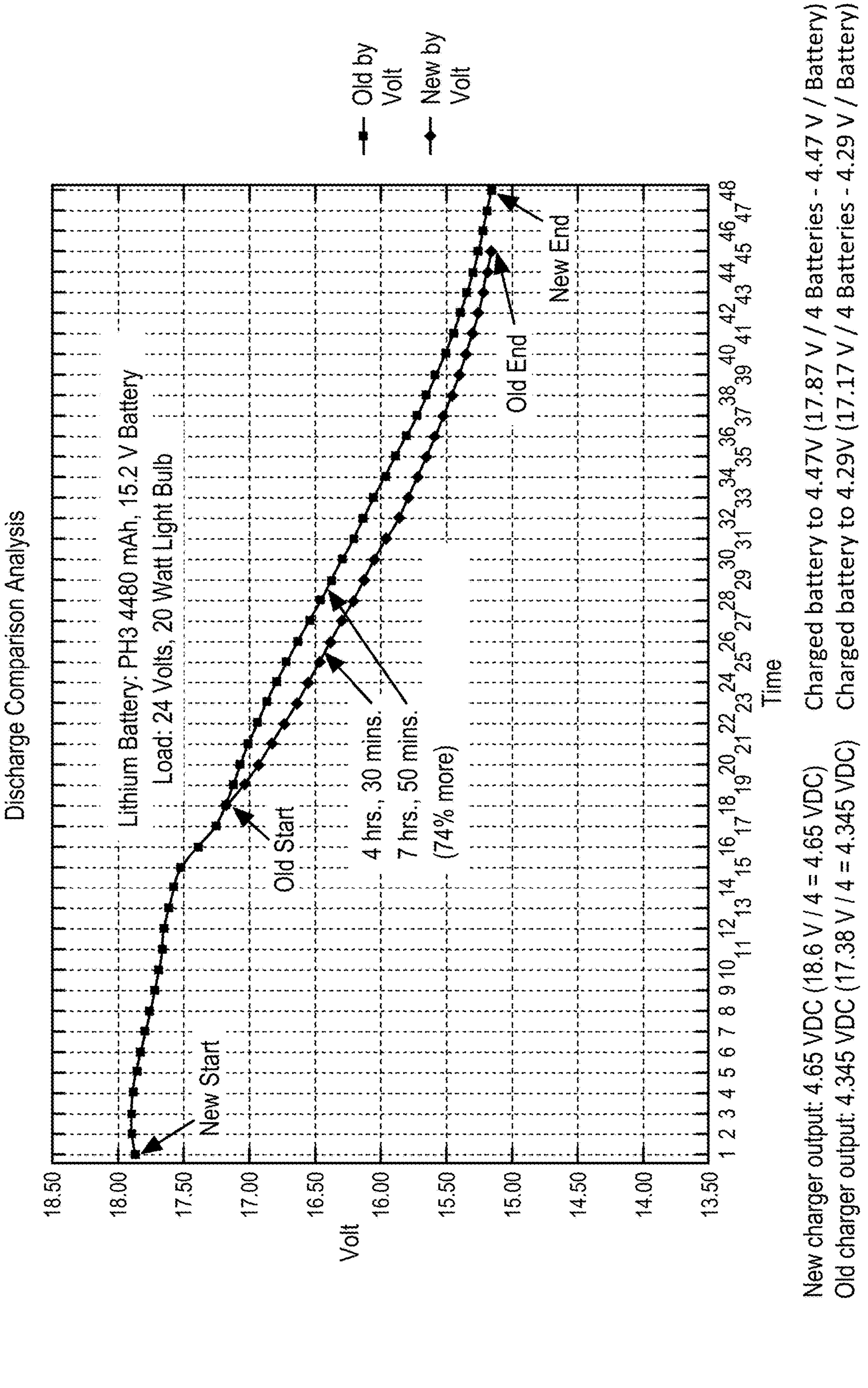
FIG. 9 is a diagram illustrating comparisons between a battery charged with a charger according to the prior art and a charger according to the invention.

FIG. 9 shows a comparison between a charger according to the prior art ("old") and a charger according to the invention ("new"). The same battery is charged at 4.65 VDC as compared with 4.345 VDC in old charger, resulting in a faster charging time. The charge of the battery is 4.47 V when using the new charger, as compared to 4.29 V when using the old charger. The battery charged with the new charger lasts for 5 minutes before it reaches the charging voltage of the battery charged using the old charger. In total, the battery charged with the new charger lasts 74% longer than the battery charged with the old charger. While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A system for transferring electric power comprising:

a power supply conductor to conduct a power supply current that generates a first resultant magnetic field;

an electric motor having a power input terminal connected to the power supply conductor and a movable output component, the electric motor being configured to convert the power supply current to movement of the movable output component; and a generator having a movable input component connected to the movable output component such that the movable output component causes movement of the movable input component, and a power output terminal, the generator being configured to convert the movement of the movable input component into a power output current to the power output terminal that generates a second resultant magnetic field that is uncoupled from the first resultant magnetic field, wherein the first resultant magnetic field has a first helical shape with a first pitch, the second resultant magnetic field has a second helical shape with a second pitch, and the first pitch is larger than the second pitch.

2. The system of claim 1, wherein the power supply conductor is a single phase alternating current power supply conductor, further comprising:

a single phase alternating current ground conductor;

a speed controller connected to the single phase alternating current power supply conductor and to the single phase alternating current ground conductor; and at least one motor power supply conductor connecting the speed controller to the motor, wherein the speed controller is operable to control a speed of the movable output component.

3. The system of claim 2, further comprising:

three three-phase motor power supply conductors connecting the speed controller to the electric motor.

4. The system of claim 1, wherein the movable output component is a rotating output axle.

5. The system of claim 1, wherein the movable input component is a rotating input axle.

6. The system of claim 1, wherein the generator includes:

a coil; and first and second magnets that are mounted in position to create a current generation magnetic field between the first and second magnets, wherein at least a first set of the field line guides are formed in the first magnet.

7. The system of claim 6, wherein at least a second set of the field line guides are formed in the second magnet.

8. The system of claim 6, wherein the movable input component moves the coil relative to the first and second magnets to generate a current in the coil.

9. The system of claim 8, wherein the movable input component rotates the coil relative to the first and second magnets to generate a current in the coil.

10. The system of claim 9, further comprising:

a delivery circuit; and at least a first commutator that connects a first end of the coil to delivery circuit.

11. The system of claim 10, further comprising:

at least a second commutator that connects a second end of the coil to the delivery circuit, the coil having a section between the first and second ends thereof that travels through a current generation magnetic field created by the magnets to generate the current in the coil.

12. The system of claim 6, wherein the first and second magnets are first and second permanent magnets.

13. The system of claim 6, wherein the first and second magnets are first and second electromagnets, further comprising:

an electromagnet power delivery circuit connected to the first and second electromagnets.

14. The system of claim 1, further comprising:

a delivery circuit connected to the power output terminal, the delivery circuit including:

at least a first set of charging terminals including a positive charging terminal and a negative terminal that are positioned relative to one another for charging a first battery.

15. The system of claim 14, further comprising:

at least a first battery having positive and negative battery terminals connected between the positive and negative charging terminals of the first set of charging terminals.

16. The system of claim 14, further comprising:

at least a second set of charging terminals including a positive charging terminal and a negative terminal that are positioned relative to one another for charging a second battery.

17. The system of claim 14, wherein the second resultant magnetic field has a helical shape around the battery.

18. The system of claim 1, further comprising:

a plurality of field line guides positioned for field lines of the second resultant magnetic field to couple to the plurality of field line guides, wherein the plurality of field line guides are formed to guide the field lines into a helical shape.

19. The system of claim 18, wherein the first resultant magnetic field has a helical shape with a pitch that is larger than a pitch of the field line guides.

20. A method of transferring electric power comprising:

conducting a power supply current that generates a first resultant magnetic field;

converting the power supply current to movement of the movable output component; and converting the movement into a second electric current that generates a second resultant magnetic field that is uncoupled from the first resultant magnetic field, wherein the first resultant magnetic field has a first helical shape with a first pitch, the second resultant magnetic field has a second helical shape with a second pitch, and the first pitch is larger than the second pitch.

* * * * *